United States Patent [19]

Farnum et al.

[11] 3,997,435
[45] Dec. 14, 1976

[54] METHOD FOR SELECTING HOLLOW MICROSPHERES FOR USE IN LASER FUSION TARGETS

[75] Inventors: Eugene H. Farnum; R. Jay Fries, both of Los Alamos, N. Mex.; Jerry W. Havenhill, Independence, Mo.; Maurice Lee Smith, Kansas City, Mo.; Daniel L. Stoltz, Blue Springs, Mo.

[73] Assignee: The United States of America as represented by the United States Energy Research and Development Administration, Washington, D.C.

[22] Filed: Oct. 29, 1975

[21] Appl. No.: 626,953

[52] U.S. Cl. .................................... 209/10; 209/1; 209/17; 209/133; 209/172; 209/250; 75/37; 176/1

[51] Int. Cl.² ......................................... B07B 15/00

[58] Field of Search ........................... 209/1–4, 209/10, 12, 30, 31, 132, 133, 233, 17, 138, 139 R, 140, 141, 158–161, 208, 209, 172, 250; 75/37, 432 PS; 65/21, 29; 176/1; 331/DIG. 1; 428/406; 106/40 R, 40 V

[56] References Cited
UNITED STATES PATENTS

| 2,621,034 | 12/1952 | Stecker | 209/138 X |
| 3,030,215 | 4/1962 | Veatch et al. | 65/21 X |
| 3,756,400 | 9/1973 | Kammori et al. | 209/1 |
| 3,838,998 | 10/1974 | Matthews et al. | 65/21 |

OTHER PUBLICATIONS

Paul et al., "Production and Separation of Small Glass Spheres", British J. Appl. Phys., vol. 3, Oct. 1952, pp. 311–314.

*Primary Examiner*—Frank W. Lutter
*Assistant Examiner*—Ralph J. Hill
*Attorney, Agent, or Firm*—Dean F. Carlson; Edward C. Walterscheid

[57] ABSTRACT

Hollow microspheres having thin and very uniform wall thickness are useful as containers for the deuterium and tritium gas mixture used as a fuel in laser fusion targets. Hollow microspheres are commercially available; however, in commercial lots only a very small number meet the rigid requirements for use in laser fusion targets. Those meeting these requirements may be separated from the unsuitable ones by subjecting the commercial lot to size and density separations and then by subjecting those hollow microspheres thus separated to an external pressurization at which those which are aspherical or which have nonuniform walls are broken and separating the sound hollow microspheres from the broken ones.

8 Claims, 6 Drawing Figures

Glass end cap

METHOD FOR SELECTING HOLLOW MICROSPHERES FOR USE IN LASER FUSION TARGETS

BACKGROUND OF THE INVENTION

The invention described herein relates to a method for selecting hollow microspheres useful as containers for the high pressure gaseous deuterium and tritium fuel in laser fusion targets.

A mixture of deuterium and tritium is a preferred fuel for laser fusion, primarily because the least energy is required to cause these two isotopes to undergo thermonuclear reaction. It is desirable that the DT mixture acted upon by the laser radiation be as dense as possible. The optimum density is achieved by cooling the mixture sufficiently that it becomes a solid. This, however, requires temperatures below 20 K which imposes very severe constraints not only on the manufacture, but also on the handling of laser fusion targets.

Alternatively, hollow, spherical, DT-gas-filled targets with diameters ranging from 30 to greater than 200 $\mu$m and with contained fuel pressures varying from 10 to 1000 atm (at 298 K) are of interest for laser fusion. The primary gas-containment vessels of these targets are hollow microspheres. The targets are filled by diffusing DT fuel gas through the walls at elevated temperatures, taking advantage of the exponential temperature dependence of the permeability to allow the gas to be retained for useful times at room temperature. Thus, when the hollow microspheres are placed in a deuterium and tritium gas mixture of a desired ratio at high pressure and elevated temperature, the deuterium and tritium readily enter the hollow microspheres and equilibrate to the surrounding gas pressure. When the hollow microspheres are cooled to room temperature, the diffusion rate through their walls is greatly reduced, so that the DT mixture within the hollow microspheres remains at high pressure for times which permit useful storage before the targets are irradiated by the laser.

An essential requirement of the hollow microspheres is that they have a thin and uniform wall thickness. Hollow microspheres that are aspherical or have nonuniform walls or walls with defects therein are not suitable. Hollow microspheres of interest include metal, ceramic, plastic, and glass.

Various types of hollow microspheres are commercially available. Thus, for example, nickel-alloy hollow microspheres sold under the tradename Solacells by the Solar Division of International Harvester, have a composition by weight of ~ 70% Ni, 21% Mn, 2.5% Si, 1.5% each of Fe and B, and trace quantities of numerous other metals. Solacells are available in sizes from 75 $\mu$m to greater than 500 $\mu$m diameter, with wall thicknesses of 0.8 to 2.5 $\mu$m.

Glass hollow microspheres may be obtained under the tradename Eccospheres or Microballoons from Emerson and Cuming Company. Eccospheres are available in many different grades. The IG-101 grade is a soft soda glass consisting by weight of ~ 78% $SiO_2$, 3% $B_2O_3$, and 19% $Na_2O$. The SI grade is a borosilicate glass consisting by weight of ~ 92% $SiO_2$, 2.5% $B_2O_3$, 2.5% $Na_2O$, and with the balance unknown. The size of the Eccospheres range from < 40 $\mu$m through 200 $\mu$m, with wall thicknesses of < 1 to > 2 $\mu$m.

Glass microspheres designated 3M microspheres are available in many types from Minnesota Mining and Manufacturing Company. The B40A type is made from a soda-lime glass consisting by weight of ~ 78% $SiO_2$, 11% $Na_2O$, 7% CaO, and 4% $B_2O_3$. It has about the same size range as the Eccospheres and has wall thicknesses ranging from about < 1 to > 3 $\mu$m.

Unfortunately, no technique has as yet been devised for manufacturing these hollow microspheres such that they routinely will meet the strict size and wall thickness requirements for use in laser fusion targets. It is thus necessary to perfect techniques for separating from a much larger mass of imperfect hollow microspheres those hollow microspheres which do in fact conform to the requisite size and wall thickness. Thus, for example, the glass hollow microspheres are typically available in minimum orders of 2 to 10 lb. There are about $10^{10}$ hollow microspheres per pound, and it is conservatively estimated that only ~ 5 in $10^5$ is suitable for use in a laser fusion target. The problem is selecting the sixty thousand good hollow microspheres from the ten billion bad ones in each pound.

SUMMARY OF THE INVENTION

Hollow microspheres for use in laser fusion targets may effectively be selected from large commercial lots by (a) sizing the microspheres in the lot and separating out those having the desired diameter, (b) subjecting those hollow microspheres having the desired diameter to a density separation whereby those having the desired wall thickness and diameter are separated from those which do not, (c) subjecting those hollow microspheres having the desired dimensions and wall thickness to an external pressurization at which those which are aspherical or which have nonuniform walls are broken but those which are spherical and have uniform walls retain their structural integrity, and (d) separating the sound hollow microspheres which remain after the pressurization from those which are broken.

The sizing and separation according to size may be accomplished by screening, while the density separation is preferably accomplished by static gas floatation. Static gas floatation is easily achieved by placing hollow microspheres of varying density in an elongate pressure vessel having its elongate axis disposed vertically and having an inverted hollow conical vessel disposed therein on the vertical axis and near the top of the elongate vessel, with the mouth of the conical vessel forming an annulus with the wall of the elongate vessel. The elongate vessel is pressurized with a high molecular weight, nonreactive gas to a pressure at which those hollow microspheres of a certain desired density float through the annulus to the top of the elongate vessel. When the pressure is lowered, these floating microspheres then drop into the conical vessel, from which they can readily be removed. It is readily apparent that by varying the pressure over a rather wide range, those microspheres with widely varying densities can be separated from each other by this technique. A gas particularly useful for this purpose is $SF_6$.

DESCRIPTION OF THE PREFERRED EMBODIMENT

Selection of hollow microspheres for use in laser fusion targets requires that they be separated from broken hollow microspheres and sized according to diameter and wall thickness and that those which meet diameter and wall thickness requirements but which have imperfections in either their walls or their shape be separated and discarded.

Screening methods for sizing small particles are well known. Usual methods of this type involve screening the particles—in this case hollow microspheres—by placing them in the top of a screen stack and agitating them through various sized screens in the stack. Unfortunately, this does not remove shards and very small hollow microspheres which cling to the larger microspheres by surface or electric forces. Dry screening methods which use fairly sophisticated equipment (Alpine rotating vane sieve, for example) are successful in removing small microspheres but not the shards. Wet screening, as for example by water flowing through a standard screen stack, is reasonably successful in removing shards but is not successful in eliminating small hollow microspheres.

Figure 1:
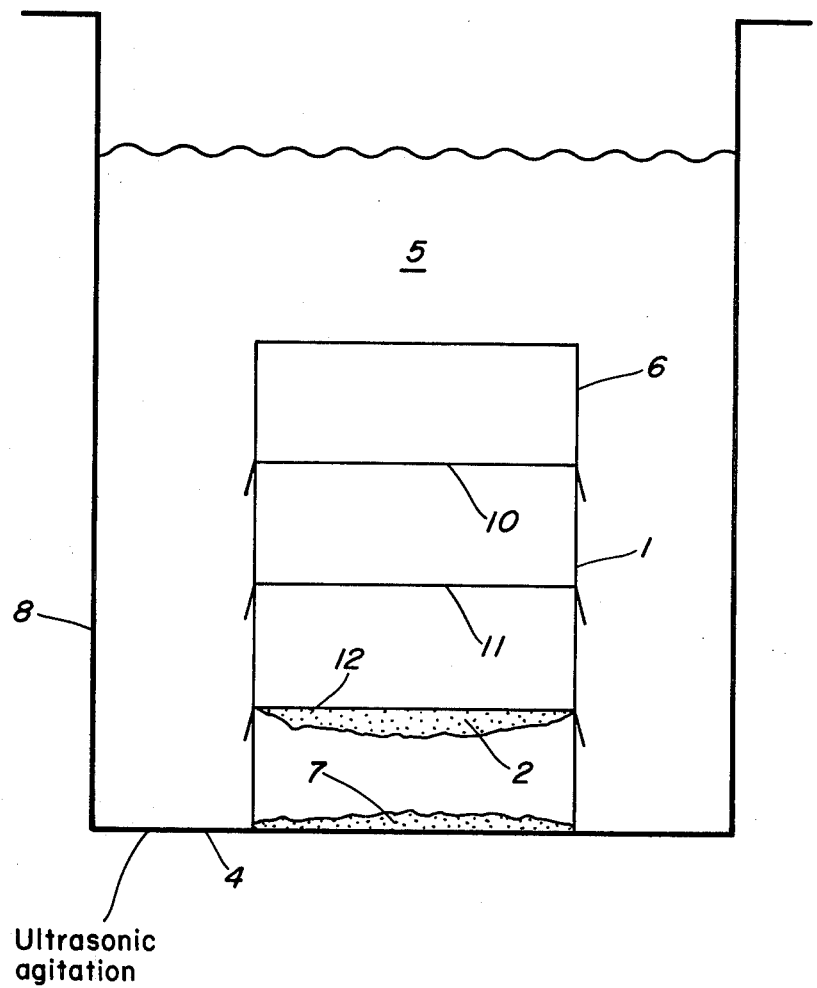
FIG. 1 is a schematic drawing of apparatus useful in sizing hollow microspheres.

A combination of wet and dry screening may be used to size the hollow microspheres by diameter and remove those of the desired diameter from broken hollow microspheres and those of differing diameters. A preferred approach, however, is that illustrated schematically in FIG. 1. A screen stack 1 is inverted and totally immersed in a high purity solvent 5. Typically, a plurality of standard sieving screens 10, 11, 12 having 3-, 5-, or 8-inch diameters are used. Any number (provided the entire assembly is covered with liquid) or mesh size may be used. Screen stack 1 is topped by a collection pan 6. Any high purity solvent which does not leave a residue may be used provided it has a density at which the hollow microspheres float. A preferred solvent is ethanol which is relatively nontoxic and can be obtained at low cost and high purity. The hollow microspheres 2 desired to be sized are placed beneath the lower-most screen in stack 1 and ultrasonic agitation 4 is applied to solvent bath 5. Those hollow microspheres which are not highly porous float to the bottom screen and pass through the various screens in accordance with their sizes. Highly porous hollow microspheres, broken hollow microspheres, and other solids 7 remain at the bottom of bath container 8. When screening is completed, the screens are removed sequentially from the top and the sized hollow microspheres removed.

This sizing serves to remove hollow microspheres with gross imperfections but does not establish wall thickness or remove those hollow microspheres with lesser imperfections. It is thus necessary to subject those hollow microspheres obtained by this sizing step to additional characterizing operations.

Accordingly, the closely sized hollow microspheres are next separated according to density. Such a separation closely corresponds to a separation according to average wall thickness. Because the apparent density of the hollow microspheres can be as low as 0.05 g/cm$^3$, liquid sink/float methods are not applicable because appropriate low-density liquids do not exist. This difficulty is avoided through the use of gas-floatation methods.

Figure 2:
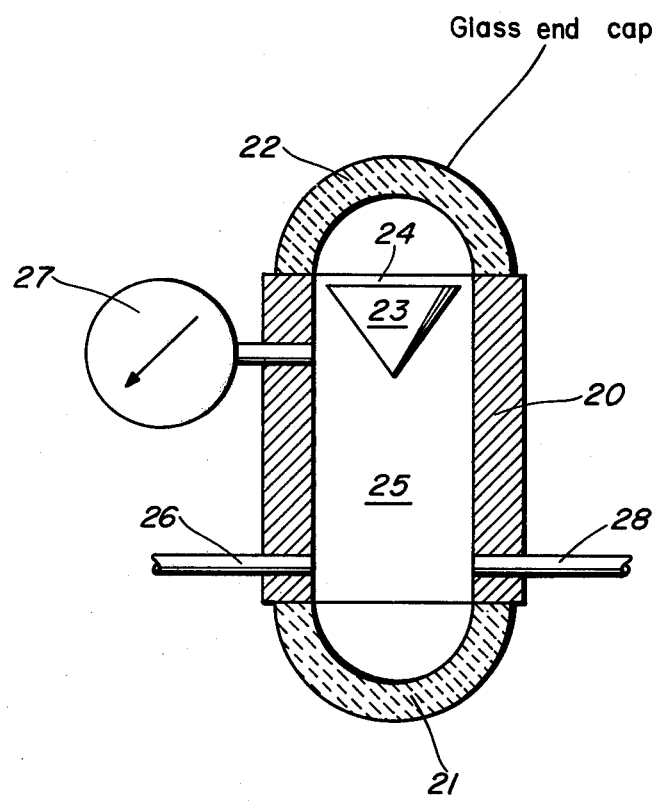
FIG. 2 is a schematic drawing of apparatus useful in the static gas floatation method for separating hollow microspheres in accordance with their density.

A static floatation method using the apparatus shown schematically in FIG. 2 is preferred. The apparatus consists of an elongate, e.g., cylindrical, pressure tight vessel 20 oriented vertically to which are attached hemispherical end caps 21 and 22. If desired, end caps 21 and 22 may be of glass to permit observation of the separation process. A conical collector vessel 23 is centered within vessel 20 with its mouth 24 facing upward, just below the mating point of vessel 20 and end cap 22. The hollow microspheres to undergo density separation are placed in end cap 21 and vessel 20 is then pressurized with an appropriate gas 25 through inlet 26. The pressure is monitored by gauge 27 and gas may be vented as necessary through vent 28. By increasing its pressure, the density of gas 25 is increased to a point at which the lower density hollow microspheres in end cap 21 float upwards past collector vessel 23 and collect in end cap 22. When the gas density is reduced by lowering the pressure, i.e., by venting gas through vent 28, the hollow microspheres floating against end cap 22 tend to drop straight down and are collected in collector vessel 23. Because of the small size of the hollow microspheres, the apparatus of FIG. 2 need not be large. Thus, for example, pressure vessel 20 may usefully have a 2.5-cm inside diameter and mouth 24 of collector vessel 23 have a diameter of 2 cm. Agglomeration of hollow microspheres within the apparatus may be minimized by periodic vibration. This is readily accomplished with, for example, a vibrating engraving tool.

A preferred gas 25 for use in the apparatus of FIG. 2 is $SF_6$. The density of $SF_6$ can be adjusted from < 0.01 g/cm$^3$ to a maximum of ~ 0.7 g/cm$^3$ by controlling its pressure, so that hollow microspheres of lesser density within this range can be floated. Sulfur hexafluoride has a high molecular weight, low critical temperature (319 K), and is inert and nontoxic. When $SF_6$ is used, the apparatus of FIG. 2 may be mounted in a drying oven and operated at ~ 330 K to prevent condensation of the $SF_6$.

A further advantage of this static gas floatation technique is its ability to separate porous hollow microspheres from those not containing any porosity. The gas 25 penetrates through small micropores so that the effective density of any porous hollow microsphere is that of its wall material. Therefore, the porous hollow microspheres are eliminated since only the floating hollow microspheres are collected in vessel 23. Also, any spheres that are broken by the applied external pressure will automatically be separated from the sound ones.

Figure 3:
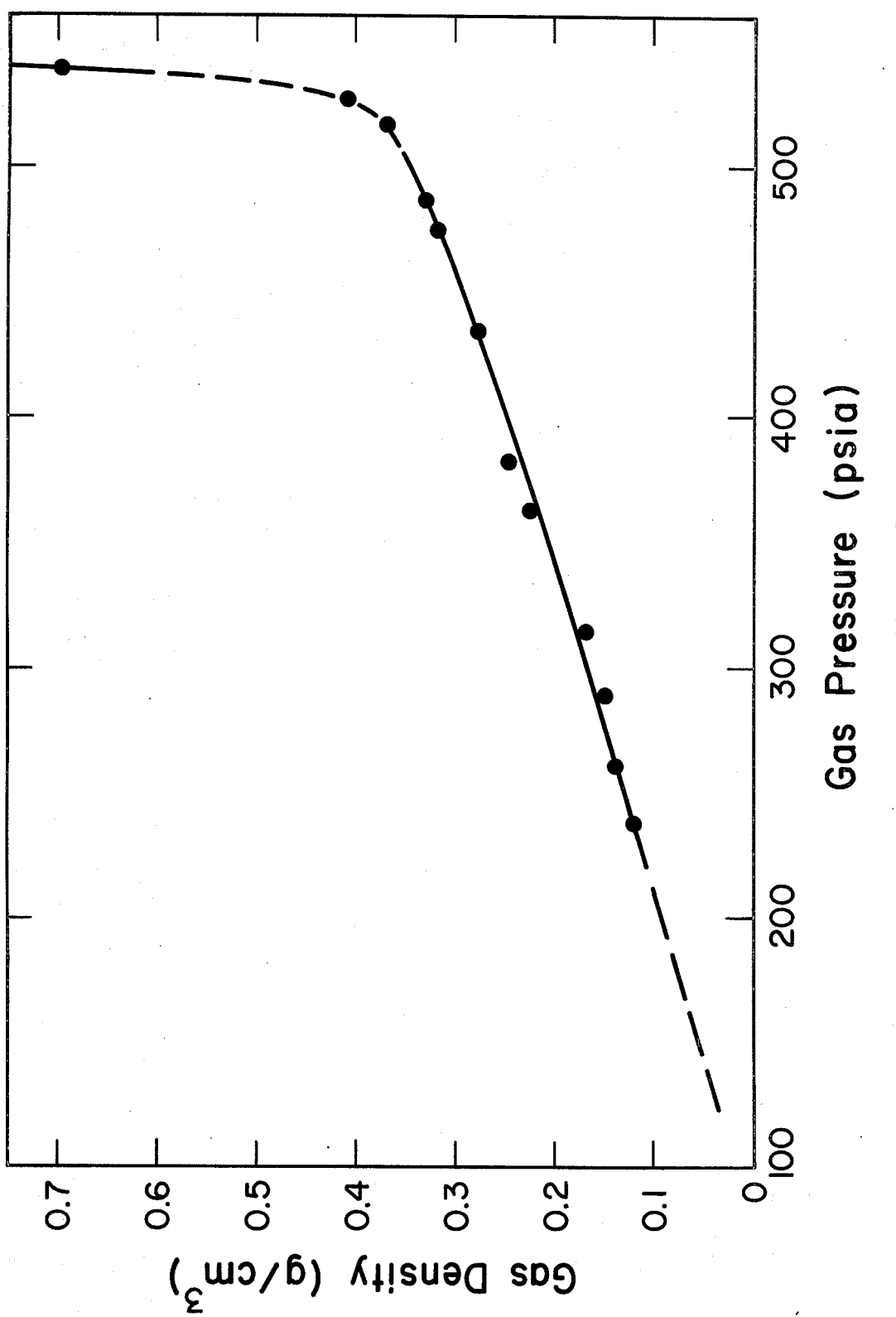
FIG. 3 is a curve showing the variation in density of $SF_6$ gas at 333 K with gas pressure.
Figure 4:
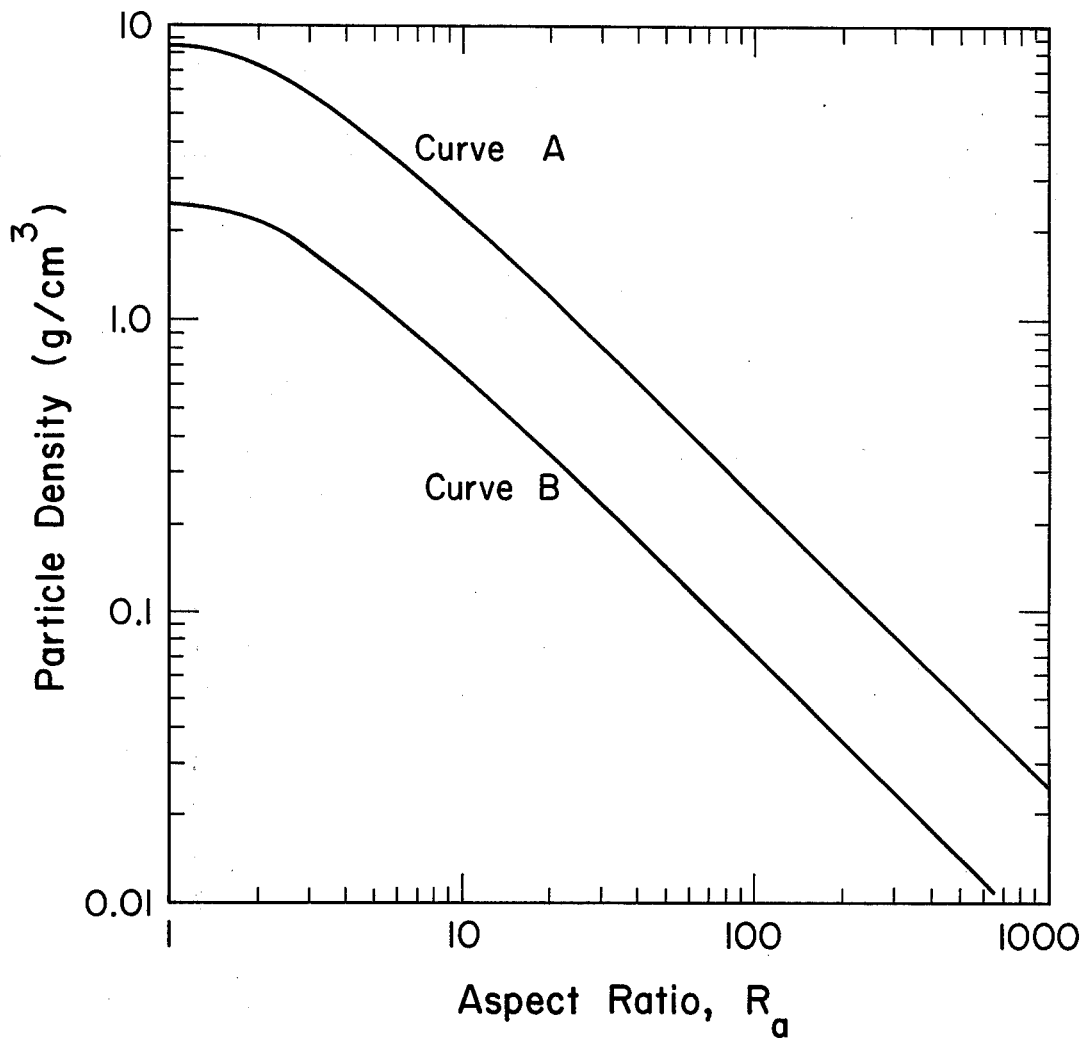
FIG. 4 shows the variation in density with aspect ratio for two types of hollow microspheres.

Data for the density of $SF_6$ at 333 K, extrapolated from literature values (H. C. Miller, L. S. Verdelli and J. F. Gall, Ind. & Eng. Chem. 43 (1951) 1126), are presented in FIG. 3. FIG. 4 presents curves of particle densities as a function of the hollow microsphere aspect ratio, $R_a$, ($R_a$ = Radius ÷ wall thickness) for glass hollow microspheres having a glass density of 2.45 g/cm$^3$ (curve A) and for Solacells having a metal density of 8.4 g/cm$^3$ (curve B).

The foregoing sizing and density separation techniques do not automatically assure hollow microspheres suitable for use in laser fusion targets. Thus, for example, aspherical hollow microspheres and those having nonuniform wall thicknesses may be included among the population of "product" hollow microspheres even after separation in accordance with these techniques. It is for this reason that an external pressurization test is included as a part of the selecting process.

The purpose of the "crunch test," as it is commonly called, is to destroy hollow microspheres that are aspherical, having nonuniform walls, or contain defects in the walls. A perfect sphere having a uniform thin wall, i.e., wall thickness less than 10% of the radius, fails by elastic buckling at an applied external pressure, $P_{ext}$, given by $$P_{ext} = 1.46E \left(\frac{t}{D}\right)^2$$

where E is Young's modulus of the wall material, $t$ is the wall thickness, and D is the mean diameter. Any deviation from a spherical shape or from a uniform wall substantially decreases the pressure at which elastic buckling occurs. Smaller hollow microspheres, e.g., those having a diameter of $\sim 50$ $\mu$m, may fail as a result of excessive compressive hoop stresses defined by $$S_c = P_{ext} D/4t$$

where $S_c$ is the compressive hoop stress and the other symbols are as previously defined. However, aspherical hollow microspheres and/or those with nonuniform walls still fail at pressures substantially less than those predicted by the formula for good hollow microspheres. Thus, regardless of which failure mechanism applies, at a proper pressure the "crunch test" effectively destroys those hollow microspheres which are defective but those without defect come through unscathed. All that is required then is to separate the unbroken ones. This may easily be accomplished by inverted screening in an ethanol bath which has been described in this specification.

Figure 5:
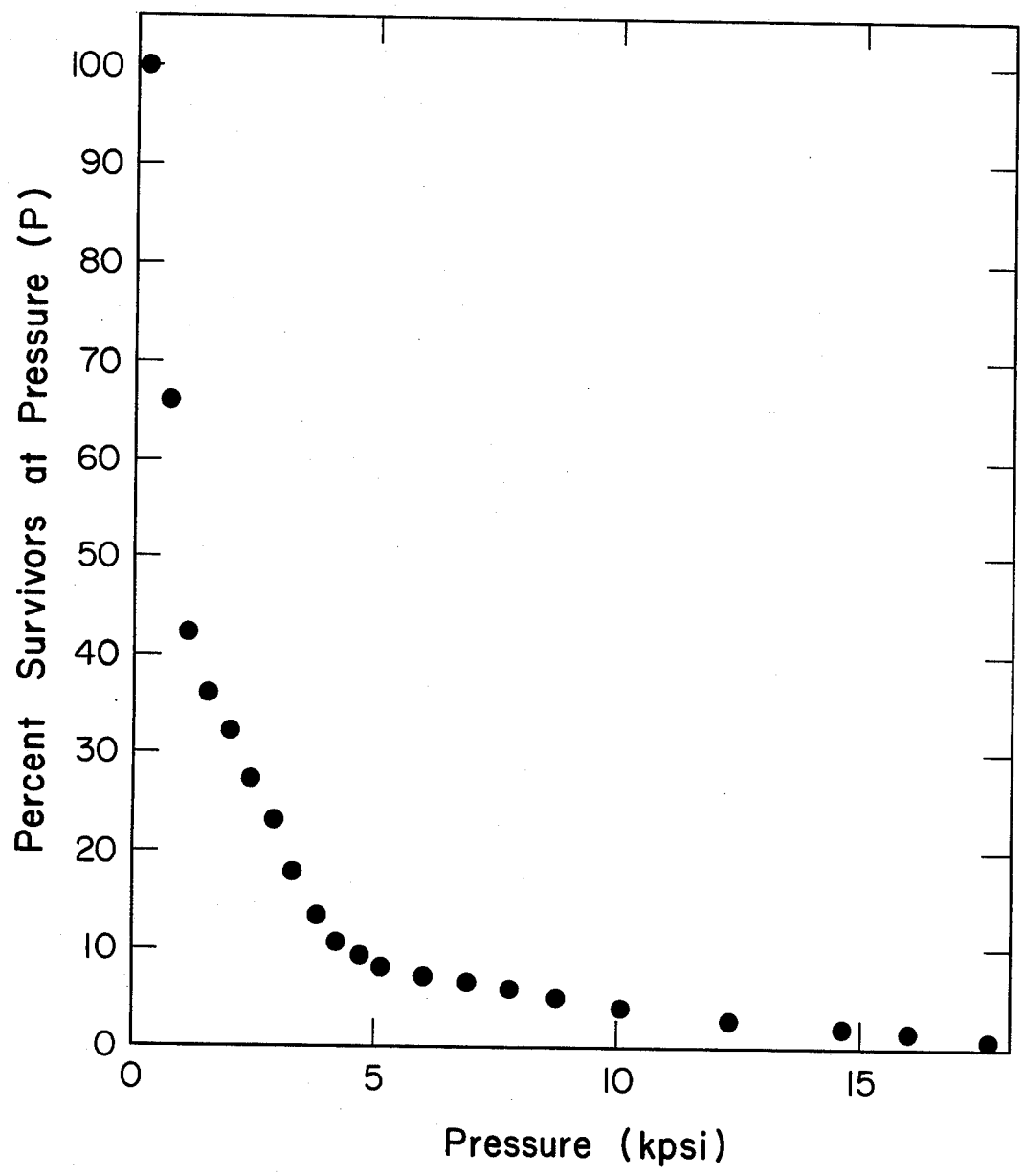
FIG. 5 is a curve showing the percentage of 3M type B 18A hollow microspheres having 90- to 105-$\mu$m diameters and 0.8- to 1.1-$\mu$m wall thicknesses surviving as a function of applied external pressure.

In practice, the "crunch test" is applied by first determining experimentally the relationship between applied pressure and number of hollow microspheres surviving and deriving a curve such as that shown in FIG. 5. This curve is obtained initially by using only a small portion of the population of hollow microspheres to be tested. Based on the curve, a pressure is then chosen which gives the desired balance between number and quality of survivors e.g., 0.1 to 10% survivors, and the remainder of the population is then subjected to that pressure.

Figure 6:
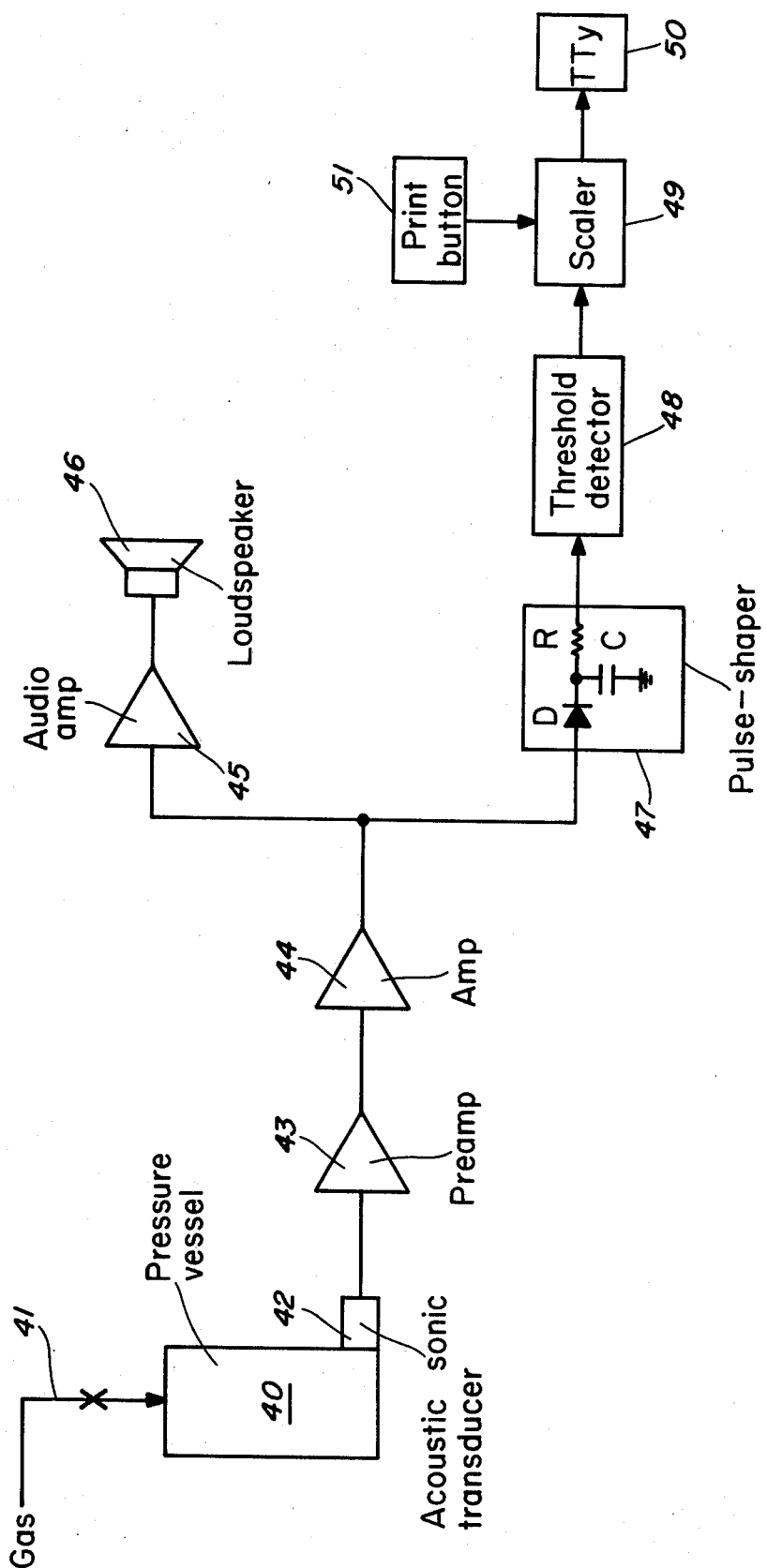
FIG. 6 is a schematic drawing of apparatus useful in sensing and counting the number of hollow microspheres broken as the external pressure is increased.

A particularly advantageous way to obtain data such as that given in FIG. 5 is by acoustical methods using the apparatus shown schematically in FIG. 6. The hollow microspheres are placed in pressure vessel 40 in which the applied gas pressure is controlled through gas inlet 41. An acoustic transducer 42 is clamped to vessel 40. As the pressure is increased in vessel 40, transducer 42 detects the acoustical noises produced as individual hollow microspheres break. The output from transducer 42 is amplified in preamplifier 43 and amplifier 44. The amplified acoustical pulses are then transmitted to audio amplifier 45 and pulse shaper 47. The purpose of audio amplifier 45 and loudspeaker 46 is to aid the operator in maintaining the system operation. In pulse shaper 47 the integration constant must be matched to the threshold detector 48 used. The diode (D = 1N1001) rectifies the sound pulse, while the R(= 1000 $\Omega$) C(= 0.1 $\mu$fd) circuit integrates the sound produced by a breaking microsphere into a single pulse. The amplitude of this pulse depends on the acoustical pulse strength. The resultant single pulse passes through threshold detector 48 which converts it into a single pulse compatible with scaler 49, independent of input pulse size. Scaler 49 counts the acoustical pulses from detector 48 and provides a printout 50 whenever print button 51 is activated. This acoustical technique permits the number of hollow microspheres broken to be simultaneously counted as the pressure is slowly increased. In this manner, the number broken versus pressure curve is obtained directly. Since the number of hollow microspheres in the sample is known, the fraction surviving versus pressure curve can then be readily obtained.

Acoustical measurement may also be used in a variation of the external pressurization test in which the hollow microspheres are filled with hydrogen or deuterium gas to a desired pressure and then the external pressure is gradually reduced rather than increased. The mumber of hollow microspheres that break as the pressure is reduced are acoustically counted in the same manner as with empty hollow microspheres on increasing external pressurization. Since the pressure inside the hollow microspheres is known from the fill condition, by noting the external pressure at which the hollow microspheres break the pressure differential across the wall at the time of breaking is obtained. This, in turn, can be related to the hollow microsphere burst strength if the diameter and wall thickness of the hollow microspheres are known. This permits batches of hollow microspheres to be ranked on a relative strength basis provided that the size distribution of each of the batches is similar.

3M type B18A hollow microspheres were processed in accordance with the selection method of the invention to obtain laser-fusion targets having $\sim 100$-$\mu$m diameter and an aspect ratio of 50 (corresponding to a particle density of 0.14 g/cm$^3$). The hollow microspheres were first size separated using standard screens to obtain the 90- to 105-$\mu$m diameter cut. The yield from this step was about 20% as detailed in the following table.

| Particle Size ($\mu$m) | Volume % Yield |
| --- | --- |
| > 150 | 1.3 |
| 125 to 150 | 19.6 |
| 105 to 125 | 29.4 |
| 90 to 105 | 19.5 |
| 74 to 90 | 14.4 |
| 63 to 74 | 7.5 |
| 53 to 63 | 6.9 |
| 44 to 53 | 0.5 |
| < 44 | 0.9 |

In the next step, the 90- to 105-$\mu$m diameter fraction were density separated in gaseous SF$_6$ at 333 K and those hollow microspheres that floated at 285 psig but not at 250 psig (0.13 < $\rho$ < 0.16 g/cm$^3$) were collected. The volumetric yield of this step was about 15%.

Finally, the 90- to 105-$\mu$m diameter, 0.13 to 0.16 g/cm$^3$ fraction was crunched at $\sim 18,000$ psi and the unbroken hollow microspheres separated from broken pieces by inverted screening under ethanol. The yield of this step was about 0.7%. Thus, the cumulative yield of the overall processing is about 0.02%.

The improvement in hollow microsphere quality resulting from this processing was evaluated by examining aliquot samples of hollow microspheres by optical interferometry to determine the fraction of high-quality hollow microspheres in the sample. These data are summarized in the following table. It is clear from these data that the full processing results in the highest yield of good, hollow microspheres.

| Processing Completed* | Fraction of Good Hollow Microspheres (%) |
| --- | --- |
| Screened | 0.2 |
| Screened and Floated | 6 |
| Screened, Floated and crushed at 18,000 psi | ~ 30 |
| Screened and crushed at 18,000 psi | ~ 7 |

*Size range of screened material is 90- to 105-$\mu$m. Density range of floated material is 0.13 to 0.16 g/cm$^3$.

It is important to note that even modest increases in the percentage of high-quality hollow microspheres are worthwhile if this increased quality can be effected via batch-type processes (such as density separation and crunch tests). This is because the batch processes are relatively rapid and can simultaneously process many hollow microspheres whereas the final selection, characterization, and measurement techniques are slow and must be applied one hollow microsphere at a time.

What we claim is:

1. A method for selecting hollow microspheres for use in laser fusion targets which comprises (a) obtaining a multiplicity of hollow microspheres, (b) sizing said hollow microspheres and separating from said multiplicity those hollow microspheres having a desired diameter, (c) subjecting those hollow microspheres with the desired diameter to a density separation whereby those hollow microspheres having a desired wall thickness and diameter are separated from those not having the desired dimensions, (d) subjecting those hollow microspheres having the desired dimensions and wall thickness to an external pressurization at which those hollow microspheres which are aspherical or which have nonuniform walls are broken but those which are spherical and have uniform walls retain their structural integrity, and (e) separating the sound hollow microspheres from the broken hollow microspheres.

2. The method of claim 1 wherein said sizing and separation step comprises screening said multiplicity of hollow microspheres.

3. The method of claim 1 wherein said density separation step comprises static gas floatation.

4. The method of claim 3 wherein said static gas floatation comprises (a) placing a mixture of hollow microspheres of the desired diameter but of varying density in an elongate pressure tight vessel having its elongate axis disposed vertically and having an inverted hollow conical vessel disposed therein on said axis and near the top of said elongate vessel, the mouth of said conical vessel forming a narrow annulus with the wall of said elongate vessel, (b) pressurizing said elongate vessel with a high molecular weight, nonreactive gas to a pressure at which hollow microspheres of a certain desired density float through said annulus to the top of said elongate vessel, (c) lowering the pressure of said gas in said elongate vessel whereby said less dense hollow microspheres are deposited in said hollow inverted conical vessel, and (d) removing the hollow microspheres in said conical vessel from said elongate vessel.

5. The method of claim 4 wherein said gas is SF$_6$.

6. The method of claim 1 wherein said external pressurization step comprises (a) subjecting a known portion of the population of those hollow microspheres having a desired diameter and wall thickness to a steadily increasing external pressurization, said portion being sufficient to be statistically equivalent to the remainder of said population, (b) measuring the number of hollow microspheres which are broken at particular pressures as the pressure is increased, (c) determining at which pressure all but a desired predetermined percentage of said hollow microspheres are broken, and (d) subjecting the remainder of said hollow microspheres having a desired diameter and wall thickness to external pressurization at the pressure thus determined.

7. Apparatus for separating hollow microspheres according to their density which comprises (a) an elongate pressure tight vessel adapted to contain a multiplicity of hollow microspheres and having its elongate axis disposed vertically, (b) an inverted hollow conical vessel disposed near the upper end of said elongate vessel and on its elongate axis, the mouth of said conical vessel forming a narrow annulus with the inside wall of said elongate vessel, and (c) means for disposing a high molecular weight, nonreactive gas in said elongate pressure vessel at a desired pressure.

8. A method for separating hollow microspheres according to their density which comprises (a) placing a mixture of hollow microspheres of varying density in an elongate pressure tight vessel having its elongate axis disposed vertically and having an inverted hollow conical vessel disposed therein on said axis and near the top of said elongate vessel, the mouth of said conical vessel forming a narrow annulus with the wall of said elongate vessel, (b) pressurizing said elongate vessel with gaseous SF$_6$ to a pressure at which hollow microspheres of less than a certain density float through said annulus to the top of said elongate vessel, (c) lowering the pressure of said SF$_6$ in said vessel whereby said less dense hollow microspheres are deposited in said hollow inverted conical vessel, and (d) removing the hollow microspheres in said conical vessel from said elongate vessel.

* * * * *